United States Patent [19]

Anderson

[11] Patent Number: 5,191,584
[45] Date of Patent: Mar. 2, 1993

[54] MASS STORAGE ARRAY WITH EFFICIENT PARITY CALCULATION

[75] Inventor: Michael H. Anderson, Moorpark, Calif.

[73] Assignee: Micropolis Corporation, Chatsworth, Calif.

[21] Appl. No.: 658,317

[22] Filed: Feb. 20, 1991

[51] Int. Cl.$^5$ .............................................. G06F 11/10
[52] U.S. Cl. ..................................... 371/51.1; 360/53; 371/10.1
[58] Field of Search ..................... 371/51.1, 49.1, 10.1; 365/200; 360/53; 395/575; 364/265.3, 266.3

[56] References Cited

U.S. PATENT DOCUMENTS

| | | | |
|---|---|---|---|
| 3,789,204 | 1/1974 | Barlow | 371/51.1 |
| 3,887,901 | 6/1975 | Moore, III | 371/51.1 |
| 4,016,409 | 4/1977 | Kim | 371/51.1 |
| 4,433,388 | 2/1984 | Oosterbaan | 364/900 |
| 4,870,643 | 9/1989 | Bultman et al. | 371/11.1 |
| 5,088,081 | 2/1992 | Farr | 360/47 |

OTHER PUBLICATIONS

"Strength (And Safety) in Numbers" by Michael H. Anderson, published in the Dec. 1990 issue of *Byte Magazine*, pp. 337-339.

*Primary Examiner*—Charles E. Atkinson
*Attorney, Agent, or Firm*—Poms, Smith, Lande & Rose

[57] ABSTRACT

An efficient redundant array of mass storage devices includes a plurality of hard disk drives, a controller or processor associated with each hard disk drive for calculating partial parity data and parity data, a host computer and at least one bus for communications between the host computer and the plurality of hard disk drives. The controller of a drive calculates the partial parity, which is the Exclusive Or function of the old data and the new data which is to be stored into the drive. New data is written to the location in the disk drive from which the old data was obtained. The partial parity data is transferred to the controller of another drive which contains the old parity data for the location to which the new data was written, and that controller calculates the new parity which is the Exclusive Or of the partial parity and the old parity. The new parity is written to the location on that disk drive which formerly held the old parity.

19 Claims, 4 Drawing Sheets

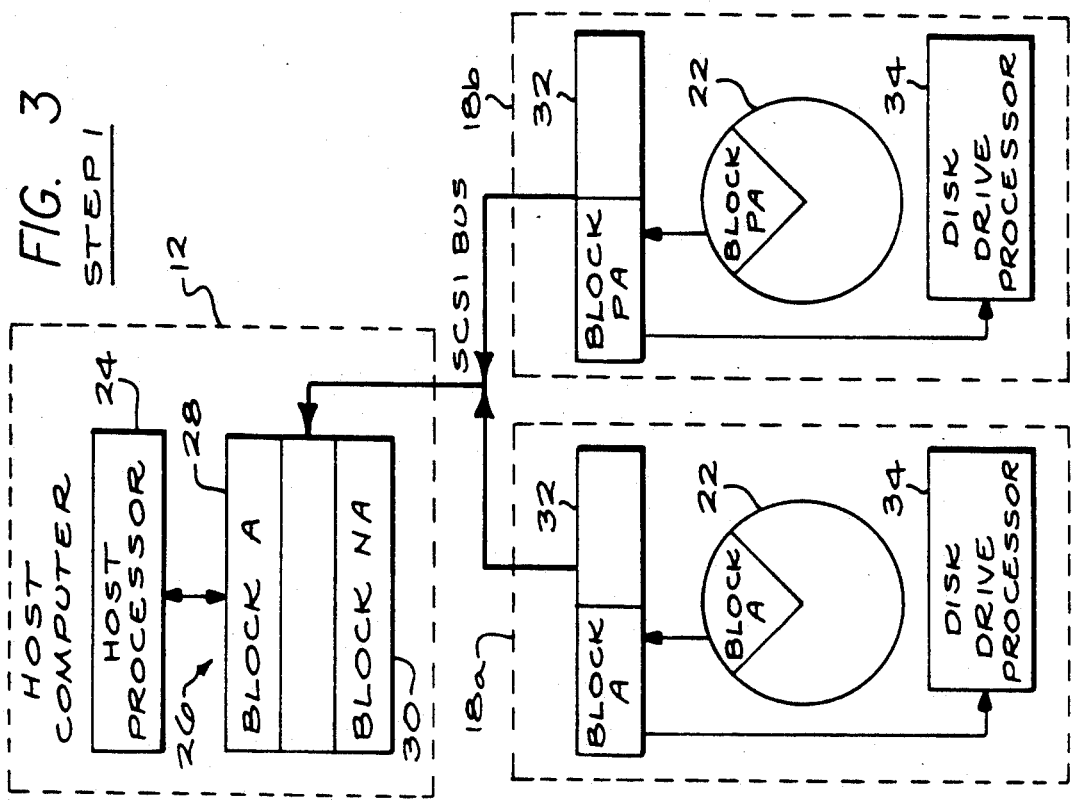
FIG. 3 STEP 1
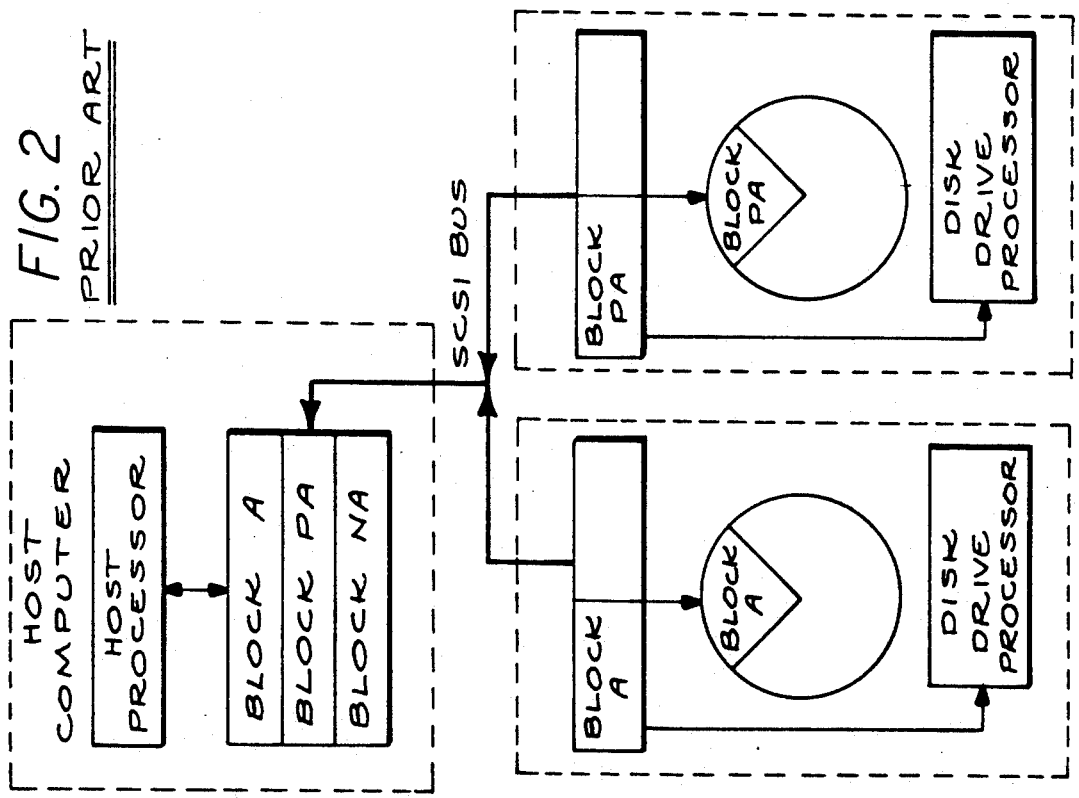
FIG. 2 PRIOR ART

STEP 2

MASS STORAGE ARRAY WITH EFFICIENT PARITY CALCULATION

FIELD OF THE INVENTION

This invention relates in general to data storage devices for computers, and more particularly to mass storage memory arrays.

BACKGROUND OF THE INVENTION

In the recent history of computers, advances in the performance and speed of central processing units (CPU's) have far outraced the advances in the performance of hard disk drives, although hard disk drives have also made great advances in the recent past. However, the far greater increases in the performance of CPU's has begun to cause input/output (I/O) bottlenecks when the CPU accesses a disk drive because the increases in disk drive performance have not caught up to the improved performance of CPU's.

Another problem is that although top quality disk drives offer a mean time between failure of about 150,000 hours, in systems using multiple disk drives failures will occur. One approach to addressing the failure problem is called mirroring. In the mirroring technique, the host computer writes data to two disk drives simultaneously. If one disk drive fails, a copy of all the data is immediately available on the other drive. Mirroring protects against a failure in one drive but it requires a user to purchase twice as much storage to hold the data and programs. Mirroring also does not address the I/O bottle-neck problem.

Another approach which addresses the problem of a failure in a multiple disk drive system is disclosed in U.S. Pat. No. 4,870,643 to Bultman, et al., which issued on Sept. 26, 1989. The Bultman patent discloses a system with five standard 5¼" Winchester disk drives with successive bytes of digital information routed to four of the drives. The fifth drive contains parity information. Control circuitry is provided so that any one of the five standard drives may be unplugged and replaced without interruption of the operation of the storage system. The Bultman computer configuration uses less drives for storing the same amount of information as the mirroring technique discussed above but does not address the I/O bottleneck problem.

A recently proposed computer configuration for partially alleviating these problems was set forth in an article titled "Strength (and Safety) in Numbers" in the December 1990 issue of Byte Magazine written by Michael H. Anderson. That computer configuration is called Redundant Arrays of Inexpensive Disks, and is referenced by its acronym "RAID".

A RAID system is a group of intelligent disk drives under the control of a single device driver or host computer. The proposed RAID system offers significantly higher performance than a single disk drive. Data can be striped or dispensed among several drives so that several of the drives are accessed in parallel to read one block of data which was striped across the several drives. This provides for quicker access than retrieving the block from a single drive.

In a RAID system, check bytes are stored, also preferably in an interleaved pattern across all of the drives. The check (or parity) byte is the sum of the data stored on the other drives in the same position. Therefore, if one drive fails the data which was stored on that drive can be quickly recreated by a calculation involving a check byte and data on the other non-failed drives for the same position. All of the above calculations are performed by the host computer.

When the host is instructed to write a block of new data which may be designated "NA" to a disk drive, the host computer first reads the old data "A" from the position to which the new data "NA" will be stored and the corresponding check bytes or parity bytes "PA" as shown in FIG. 2. Incidentally, the old parity designated "PA" is the parity involving not only the data "A", but also data from other disk drives. The host then calculates the new check bytes NPA by subtracting out the old data "A" and summing in the new data "PA". The check bytes are then rewritten over the old check bytes and the new data "NA" is written to the position where the old data "A" previously resided.

Unfortunately, though the above described RAID technique offers some improvement in performance, the host processor is forced to do a large number of calculations and multiple transfers of data over the bus which connects the host and the disk drives each time a block of data is to be written to a disk drive. The large number of calculations and the bus transfers reduces the performance of the host computer and the overall system.

As compared with the foregoing prior art arrangements, the principal objects of the present invention are to reduce the involvement of the host computer in the data storage process and to minimize the number of data transfers along the bus which interconnects the disk drives and the host computer.

SUMMARY OF THE INVENTION

In accordance with the present invention, an efficient, redundant array of mass storage devices which includes a plurality of hard disk drives, a controller or processor associated with each hard disk drive, a host computer and at least one bus for communications between the host computer and the plurality of hard disk drives includes partial parity calculating means for calculating the Exclusive Or function of old data and new data, and parity calculating means for calculating the Exclusive Or of partial parity and old parity.

Another aspect of the present invention encompasses a method for writing data to and calculating new parity data for a plurality of peripheral storage devices and a system which includes a host computer connected by a bus to a plurality of disk drives, each with its own controller. First, the system calculates the partial parity which is the Exclusive Or function of the old data and the new data which is to be stored in a location which currently holds the old data. In a preferred embodiment, the partial parity is calculated at the controller for the storage device to which the new data is written.

Next, the new data is written to the location in the peripheral storage device from the old data was obtained. The partial parity data is then written to the controller of a peripheral storage device which contains the old parity data for the location to which the new data was written. The controller which receives the partial parity calculates the new parity which is the Exclusive Or function of the partial parity and the old parity. Finally, the new parity data is written to the location in the peripheral storage device which formerly held the old parity data.

Other objects and advantages of the present invention will be apparent to those skilled in the art from the accompanying drawings and detailed descriptions.

DESCRIPTION OF THE DRAWINGS

FIG. 2 is a pictorial representation of a mass storage system known in the prior art;

FIG. 3 through 6 are block diagram representations of the present invention during different phases of the write operation;

DETAILED DESCRIPTION

Figure 1:
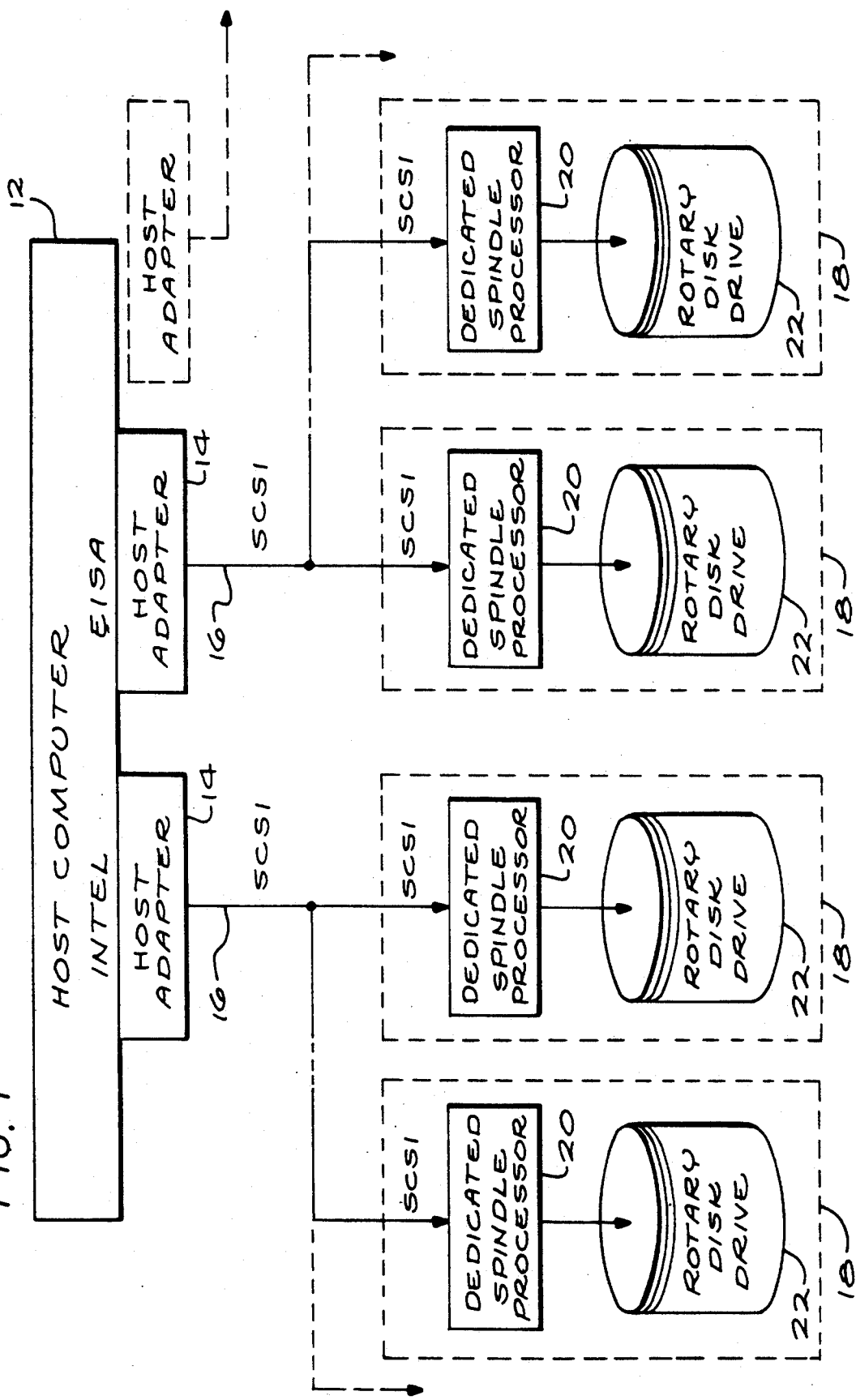
FIG. 1 is a block diagram of a computer system.

Turning now to the drawings, FIG. 1 shows a preferred embodiment of the present invention. The host computer 12, preferably a micro-computer based on the Extended Industry Standard Architecture (EISA) is shown with a plurality of interface adaptor cards 14 for coupling the host computer to a plurality of buses 16, preferably a Small Computer System Interface Bus or SCSI bus. The SCSI buses interconnect the host computer and a plurality of peripheral storage devices 18.

Each peripheral storage device 18 preferably includes a dedicated spindle processor or controller 20 for each peripheral storage device, and a rotary disk drive 22 or other similar mass storage device. In one preferred embodiment, the rotary disk drives 22 are 5¼"Winchester hard disk drives. The peripheral storage devices 18 could be implemented using 1580 series or 1370 series disk drives manufactured by Micropolis of Chatsworth, Calif.

FIG. 2 shows a prior art RAID system as was discussed in the BACKGROUND OF THE INVENTION section of this specification.

Referring now to FIG. 3, the host computer 12 is shown with more detail including the host computer's host (central) processor 24 and its dynamic memory 26. The dynamic memory 26 is shown containing a block of data A and an identical size block of new data NA. Data block A was retrieved from the buffer memory 32 from peripheral storage device 18a. Data A had originated in the disk drive 22. Data A was then transferred to buffer memory 32 and then to the host computer's dynamic memory 26.

As can also be seen in FIG. 3, within peripheral storage device 18b the parity data (check bytes) PA has been written from disk drive 22 to buffer memory 32. The parity data PA provides a parity check for all the data stored in all of the disk drives in the system in the same location as data block A. The parity data is discussed in more detail below.

Figure 4:
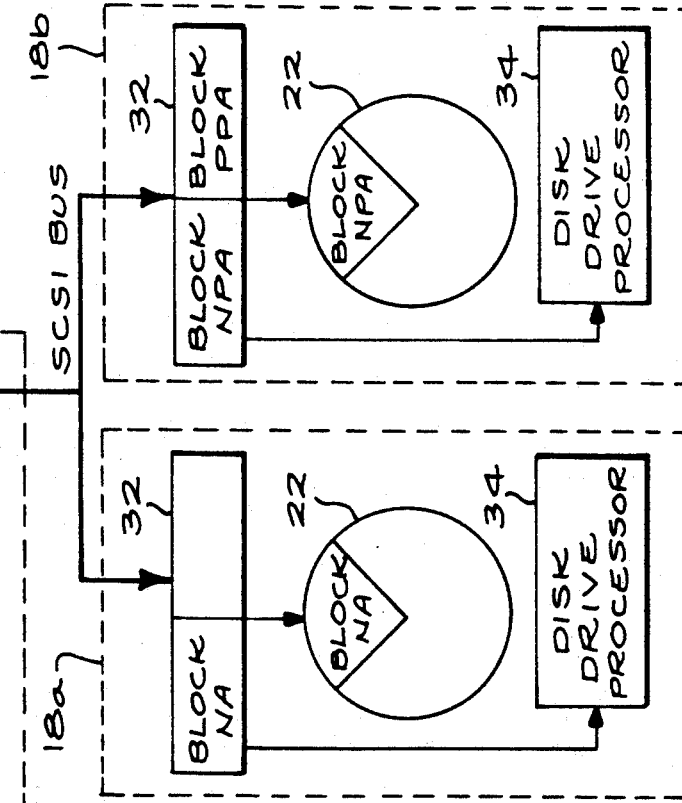

As can be seen in FIG. 4, the host processor 24 then generates partial parity data (PPA) which is the Exclusive Or of data A and data NA. Data NA is then written to the buffer storage of peripheral memory device 18a and from there data NA is written to the same location formerly occupied by the old data A in disk drive 22 within peripheral memory device 18a.

The partial parity PPA is written to buffer memory 32 of peripheral memory device 18b. Disk drive processor 34 within peripheral memory device 18b then calculates the new parity data NPA which is the Exclusive Or of PPA and PA. The new parity data NPA is then written to the same location from which PA was retrieved in disk drive 22 within peripheral memory device 18b.

The above described configuration approach allows the disk drive processor of the peripheral storage device containing the old priority data PA to calculate the new priority data NPA by performing the Exclusive Or of PPA and PA. This saves the host computer from having to perform that function. Also, the SCSI bus has one less data transfer along it. The data PA is never transferred along the bus. Therefore less bus time is also utilized which frees up the SCSI bus for data retrieval.

Figure 5:
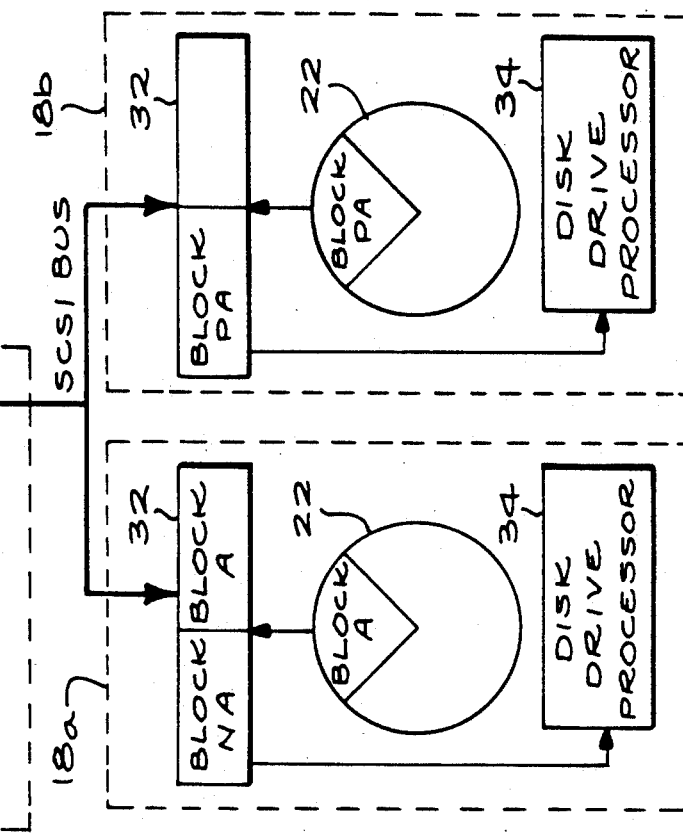
Figure 6:
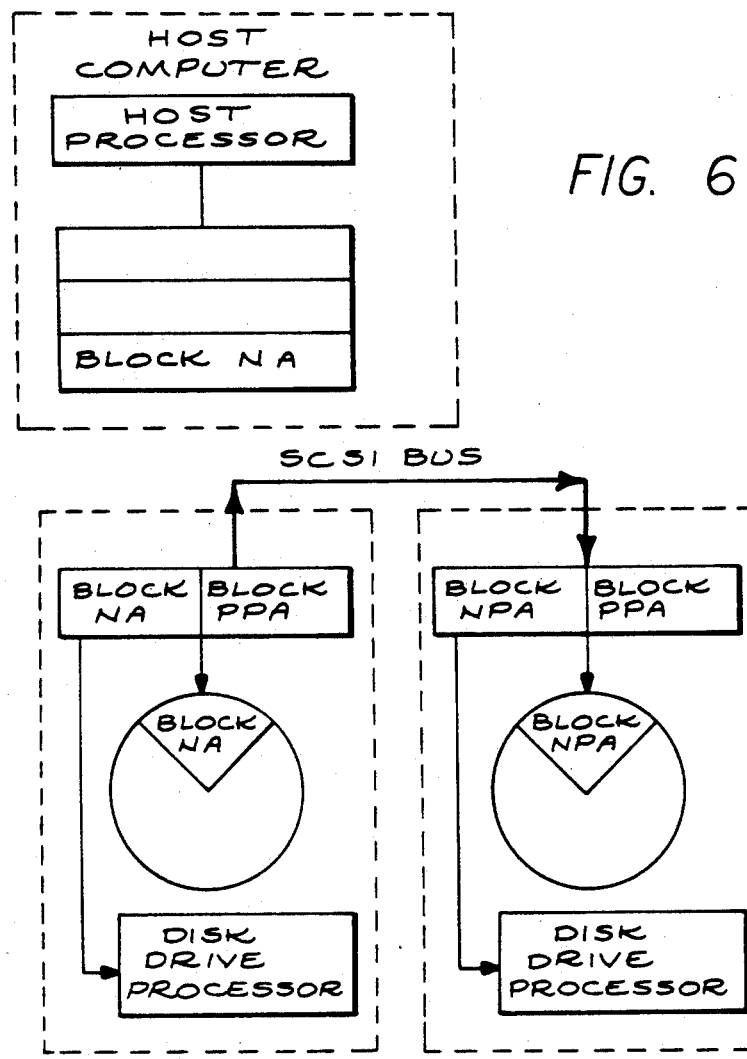

Another embodiment of the present invention is shown in FIGS. 5 and 6. FIG. 5 shows the dynamic memory 26 of the host computer 12 containing the new data NA to be written to one of the peripheral storage devices. Peripheral storage device 18a is shown with the old data A in its buffer memory 32. The new data NA is also shown as having been written to the buffer memory 32 of peripheral 18a. The buffer memory 32 of peripheral device 18b contains the old parity data PA.

The disk drive processor 34 of peripheral 18a calculates the partial parity data PPA which is the Exclusive Or of A and NA. FIG. 6 shows PPA stored buffer memory 32 of peripheral 18a after the calculation. PPA is then written to the buffer memory 32 of peripheral 18b. NA is also written to the location which held A in the disk drive 22. The disk drive processor 35 of peripheral 18b then calculates NPA (the new priority data) which is the Exclusive Or of PPA and PA. NA is then written to the location on disk drive 22 which previously contained PA.

In this embodiment, two disk drive processors calculated NPA and PPA. This saves the host computer from having to perform both of those calculations. Also, as in the previously described embodiment, the SCSI bus has one less data transfer along it as compared with the prior art systems. Therefore, less bus time is utilized, which frees up the SCSI bus for other functions.

The parity data allows the system to recreate the data stored on one disk drive from the data stored on the other drives. The parity data is the Exclusive Or of the data stored in the same location on each drive.

In a three drive system with the parity data for drives 1 and 2 stored on drive 3, the parity data would operate as follows. If location A on drive 1 contained the value 7 and location A on drive 2 contained the value 3 then the parity data stored in location A on drive 3 would be the Exclusive Or of 7 and 3.

In a four bit system 7 is represented as 0111 and three is represented as 0011. The exclusive Or of 0111 and 0011 is 0100. If drive 1 fails, the data that was stored in location A of drive 1 is the Exclusive Or of the parity data for location A, 0100 (which is stored in location A on drive 3) and the data stored in location A on drive 2, 0011. The Exclusive Or of 0100 and 0011 is 0111 or 7. This approach works for any number of drives.

Figure 7:
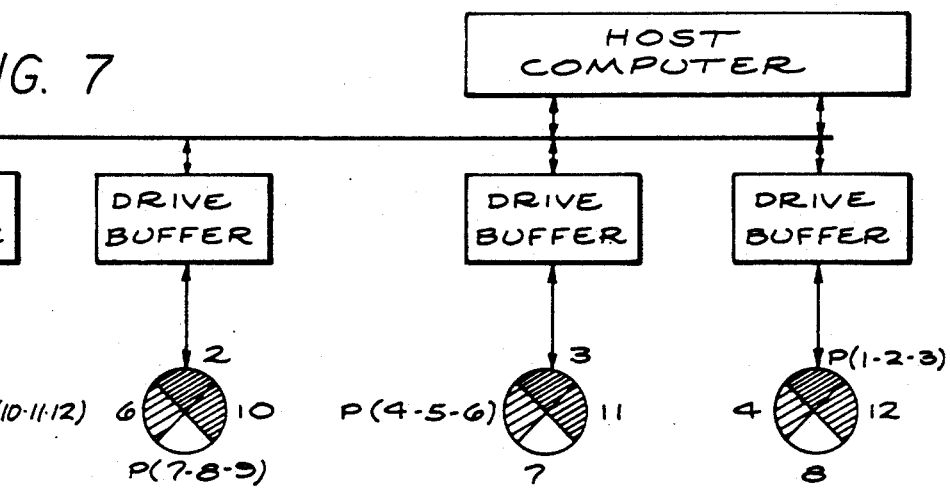
FIG. 7 is a representation of the arrangement of data and parity information across four disk drives.

FIG. 7 is a pictorial representation of the interleaving of data and parity information across four peripheral storage devices. Pie shaped sections 1, 2 and 3 represent identical locations on three different drives with P(1-2-3) representing the parity data which is stored in the same position as Sections 1, 2 and 3 on the fourth drive. Similarly, the parity data for locations 5, 6 and 4 is shown stored on the third drive in sequence.

Interleaving of the data can greatly increase the access speed of the overall peripheral memory storage system. When a data block is accessed, each drive can simultaneously access its portion of the requested data and transmit it in parallel to the host.

In conclusion, it is to be understood that the foregoing detailed description and accompanying drawings relate to illustrative implementations of the invention. The invention is not limited to these illustrative implementations. Thus, by way of example and not of limitation, a system using five, six or seven drives could be used. Also, storage units other than Winchester type disk drives, including optical storage devices, could be used as a peripheral storage device. Accordingly, the present invention is not limited to the system as described in detail herein and as shown in the accompanying drawings.

What is claimed is:

1. A method for writing data to and calculating new parity data for an efficient, redundant array of mass storage devices in a system which includes a host computer connected via a bus to a plurality of disk drives, each with its own controller, comprising the steps of:
   calculating the partial parity which is the Exclusive Or function of the old data and the new data which is to be stored in the location which holds the old data;
   writing the new data to the location in the peripheral storage device from the old data was obtained;
   transferring the partial parity to the controller of a peripheral storage device which contains the old parity data for the location to which the new data was written;
   calculating the new parity which is the Exclusive Or function of the partial parity and the old parity at the controller which receives the partial parity; and
   transferring the new parity to the location in the peripheral storage device which formerly held the old parity.

2. The method as described in claim 1 wherein the partial parity is calculated by a first controller which is the controller of the storage device to which the new data is being written.

3. The method as described in claim 1 wherein the host computer calculates the partial parity.

4. The method as described in claim 2 further including the steps of:
   the first controller receiving the new data from the host computer; and
   the first controller obtaining the old data from its associated disk drive.

5. The method as described in claim 4 wherein said first controller performs the step of transferring the partial parity to the controller of a peripheral storage device which contains the old parity data for the location to which the new data was written.

6. An efficient, redundant array of mass storage devices as defined in claim 4 wherein said system further includes a plurality of partial parity calculating means coupled respectively to said plurality of disk drives.

7. An efficient, redundant array of mass storage devices as defined in claim 7 further including means for storing the new parity on the same disk device and in the same location as the old parity previously resided.

8. An efficient, redundant array of mass storage devices as defined in claim 7 further including means for storing the new parity in the disk drive associated with the controller means which has calculated the new parity.

9. A computer system as defined in claim 7 wherein said controller further includes means for calculating partial parity data by calculating the Exclusive Or function of old data and new data.

10. A computer system as defined in claim 13 wherein said controller further includes means for receiving new data from said host computer and retrieving old data from the disk drive associated with said controller. ,;

11. A computer system as defined in claim 10 wherein said controller further includes means for transferring said partial parity data to a second controller.

12. A computer system as defined in claim 10 wherein said controller further includes means for storing the new parity data on the disk drive associated with that controller and in the same location as the old parity data previously resided.

13. A computer system as defined in claim 10 wherein said controller further includes means for storing the new data in the same location as the old data previously resided on the disk drive associated with that controller.

14. A computer system as defined in claim 12 wherein said at least one bus is a Small Computer System Interface bus.

15. An efficient redundant array of mass storage devices comprising:
   a plurality of hard disk drives;
   a host computer, and said host computer periodically supplying new data to said hard disk drives;
   at least one bus interconnecting said host computer and each of said hard disk drives;
   a controller coupled to each of said hard disk drives;
   each of said disk drives containing old data previously stored on said disks, and said hard disk drives also containing old parity, which is parity relating to said old data;
   partial parity calculating means which is the Exclusive Or function of old data and new data;
   said hard disk drives, each having its own controller means for calculating the new parity which is the Exclusive Or function of partial and old parity; and
   means for communicating the partial parity from said partial parity calculating means to said controller means.

16. An efficient, redundant array of mass storage devices as defined in claim 15, wherein said hard disk drives are 5¼" disk drives.

17. An efficient, redundant array of mass storage devices as defined in claim 15, wherein said bus is a Small Computer System Interface bus.

18. A computer system including an efficient, redundant array of mass storage devices comprising:
   a host computer;
   a plurality of hard disk drives;
   at least one bus interconnecting said hard disk drives and said host computer;
   each of said disk drives containing parity data previously stored on said disks; and
   a plurality of controllers coupled respectively to said plurality of disk drives including means for calculating parity data by calculating the Exclusive Or function of partial parity data and old parity data.

19. A computer system as defined in claim 18 wherein said hard disk drives are 5¼" Winchester drives.

* * * * *

UNITED STATES PATENT AND TRADEMARK OFFICE
CERTIFICATE OF CORRECTION

PATENT NO. : 5,191,584
DATED : March 2, 1993
INVENTOR(S) : Michael Anderson

It is certified that error appears in the above-indentified patent and that said Letters Patent is hereby corrected as shown below:

Claims 1-19 should read as follows:

WHAT IS CLAIMED IS:

1. A method for writing data to and calculating new parity data for an efficient, redundant array of mass storage devices in a system which includes a host computer connected via a bus to a plurality of disk drives, each with its own controller, comprising the steps of:

calculating the partial parity which is the Exclusive Or function of the old data and the new data which is to be stored in the location which holds the old data;

writing the new data to the location in the peripheral storage device from which the old data was obtained;

transferring the partial parity to the controller of a peripheral storage device which contains the old parity data for the location to which the new data was written;

calculating the new parity which is the Exclusive Or function of the partial parity and the old parity at the controller which receives the partial parity; and transferring the new parity to the location in the peripheral storage device which formerly held the old parity.

UNITED STATES PATENT AND TRADEMARK OFFICE
CERTIFICATE OF CORRECTION

PATENT NO. : 5,191,584
DATED : March 2, 1993
INVENTOR(S) : Michael Anderson

It is certified that error appears in the above-indentified patent and that said Letters Patent is hereby corrected as shown below:

2. The method as described in claim 1 wherein the host computer calculates the partial parity.

3. The method as described in claim 1 wherein the partial parity is calculated by a first controller which is the controller of the storage device to which the new data is being written.

4. The method as described in claim 3 further including the steps of:
 the first controller receiving the new data from the host computer; and
 the first controller obtaining the old data from its associate disk drive.

5. The method described in claim 4 wherein said first controller performs the step of transferring the partial parity to the controller of a peripheral storage device which contains the old parity data for the location to which the new data was written.

UNITED STATES PATENT AND TRADEMARK OFFICE
CERTIFICATE OF CORRECTION

PATENT NO. : 5,191,584
DATED : March 2, 1993
INVENTOR(S) : Michael Anderson

It is certified that error appears in the above-indentified patent and that said Letters Patent is hereby corrected as shown below:

6. An efficient redundant array of mass storage devices comprising:

a plurality of hard disk drives;

a host computer, and said host computer periodically supplying new data to said hard disk drives;

at least one bus interconnecting said host computer and each of said hard disk drives;

a controller coupled to each of said hard disk drives;

each of said disk drives containing old data previously stored on said disks, and said hard disk drives also containing old parity, which is parity relating to said old data;

partial parity calculating means which is the Exclusive Or function of old data and new data;

said hard disk drives, each having its own controller means for calculating the new parity which is the Exclusive Or function of partial and old parity; and means for communicating the partial parity from said partial parity calculating means to said controller means.

7. An efficient, redundant array of mass storage devices as defined in claim 6 wherein said system further includes a

UNITED STATES PATENT AND TRADEMARK OFFICE
CERTIFICATE OF CORRECTION

PATENT NO. : 5,191,584
DATED : March 2, 1993
INVENTOR(S) : Michael Anderson

It is certified that error appears in the above-indentified patent and that said Letters Patent is hereby corrected as shown below:

plurality of partial parity calculating means coupled respectively to said plurality of disk drives.

8. An efficient, redundant array of mass storage devices as defined in claim 7 further including means for storing the new parity on the same disk drive and in the same location as the old parity previously resided.

9. An efficient, redundant array of mass storage devices as defined in claim 8 further including means for storing the new parity in the disk drive associated with the controller means which has calculated the new parity.

10. An efficient, redundant array of mass storage devices as defined in claim 6, wherein said hard disk drives are 5¼" disk drives.

11. An efficient, redundant array of mass storage devices as defined in claim 6, wherein said bus is a Small Computer System Interface bus.

UNITED STATES PATENT AND TRADEMARK OFFICE
CERTIFICATE OF CORRECTION

PATENT NO. : 5,191,584

DATED : March 2, 1993

INVENTOR(S) : Michael Anderson

It is certified that error appears in the above-indentified patent and that said Letters Patent is hereby corrected as shown below:

12. A computer system including an efficient, redundant array of mass storage devices comprising:
    a host computer;
    a plurality of hard disk drives;
    at least one bus interconnecting said hard disk drives and said host computer;
    each of said disk drives containing parity data previously stored on said disks; and
    a plurality of controllers coupled respectively to said plurality of disk drives including means for calculating parity data by calculating the Exclusive Or function of partial parity data and old parity data.

13. A computer system as defined in claim 12 wherein said controller further includes means for calculating partial parity data by calculating the Exclusive Or function of old data and new data.

14. A computer system as defined in claim 13 wherein said controller further includes means for receiving new data from

UNITED STATES PATENT AND TRADEMARK OFFICE
CERTIFICATE OF CORRECTION

PATENT NO. : 5,191,584
DATED : March 2, 1993
INVENTOR(S) : Michael Anderson

It is certified that error appears in the above-indentified patent and that said Letters Patent is hereby corrected as shown below:

said host computer and retrieving old data from the disk drive associated with said controller.

15. A computer system as defined in claim 14 wherein said controller further includes means for transferring said partial parity data to a second controller.

16. A computer system as defined in claim 14 wherein said controller further includes means for storing the new parity data on the disk drive associated with that controller and in the same location as the old parity data previously resided.

17. A computer system as defined in claim 16 wherein said at least one bus is a Small Computer System Interface bus.

18. A computer system as defined in claim 14 wherein said controller further includes means for storing the new data in the same location as the old data previously resided on the disk drive associated with that controller.

UNITED STATES PATENT AND TRADEMARK OFFICE
CERTIFICATE OF CORRECTION

PATENT NO. : 5,191,584
DATED : March 2, 1993
INVENTOR(S) : Michael Anderson

It is certified that error appears in the above-indentified patent and that said Letters Patent is hereby corrected as shown below:

19. A computer system as defined in claim 12 wherein said hard disk drives are 5¼" Winchester drives.

Signed and Sealed this

Seventeenth Day of January, 1995

Attest:

BRUCE LEHMAN

Attesting Officer    Commissioner of Patents and Trademarks